US009171525B2

(12) United States Patent
Lindholm

(10) Patent No.: US 9,171,525 B2
(45) Date of Patent: Oct. 27, 2015

(54) GRAPHICS PROCESSING UNIT WITH A TEXTURE RETURN BUFFER AND A TEXTURE QUEUE

(71) Applicant: NVIDIA Corporation, Santa Clara, CA (US)

(72) Inventor: John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 221 days.

(21) Appl. No.: 13/778,033

(22) Filed: Feb. 26, 2013

(65) Prior Publication Data

US 2014/0240337 A1 Aug. 28, 2014

(51) Int. Cl.

| | |
|---|---|
| ***G06F 15/80*** | (2006.01) |
| ***G06F 1/20*** | (2006.01) |
| ***G06T 1/00*** | (2006.01) |
| ***G09G 5/36*** | (2006.01) |
| ***G09G 5/39*** | (2006.01) |
| ***G09G 5/00*** | (2006.01) |
| ***G06K 9/60*** | (2006.01) |
| ***G06K 9/54*** | (2006.01) |
| ***G06F 13/00*** | (2006.01) |
| ***G06F 9/26*** | (2006.01) |
| ***G06T 11/40*** | (2006.01) |
| ***G06F 12/00*** | (2006.01) |
| ***G09G 5/06*** | (2006.01) |
| ***G09G 5/393*** | (2006.01) |

(52) U.S. Cl.

CPC .................. *G09G 5/06* (2013.01); *G09G 5/363* (2013.01); *G09G 5/393* (2013.01); *G09G 2320/0252* (2013.01)

(58) Field of Classification Search

USPC ......... 345/418, 582, 501–503, 505–506, 522, 345/530–531, 543, 545, 549, 552, 554–557, 345/564–565, 558; 382/254, 276, 303–304, 382/305, 307; 711/3, 100, 113, 125, 173, 711/202, 209, 214, 221; 712/200, 205, 214, 712/220, 225

See application file for complete search history.

(56) References Cited

U.S. PATENT DOCUMENTS

| | | | | |
|---|---|---|---|---|
| 2005/0275658 A1* | 12/2005 | Sasaki et al. | .................. | 345/557 |
| 2006/0071933 A1* | 4/2006 | Green et al. | .................. | 345/426 |
| 2009/0160870 A1* | 6/2009 | Wang et al. | .................. | 345/582 |
| 2009/0189896 A1* | 7/2009 | Jiao et al. | .................. | 345/426 |
| 2009/0315908 A1 | 12/2009 | Comparan et al. | | |
| 2010/0259536 A1* | 10/2010 | Toksvig et al. | ............... | 345/418 |
| 2011/0027243 A1* | 2/2011 | Mogna et al. | .............. | 424/93.45 |
| 2014/0049549 A1* | 2/2014 | Lukyanov et al. | ............ | 345/522 |

(Continued)

OTHER PUBLICATIONS

Non-Final Office Action from U.S. Appl. No. 13/778,031, dated Dec. 29, 2014.

*Primary Examiner* — Wesner Sajous

(74) *Attorney, Agent, or Firm* — Zilka-Kotab, PC

(57) ABSTRACT

A processor and a system are provided for performing texturing operations loaded from a texture queue that provides temporary storage of texture coordinates and texture values. The processor includes a texture queue implemented in a memory of the processor, a crossbar coupled to the texture queue, and one or more texture units coupled to the texture queue via the crossbar. The crossbar is configured to reorder texture coordinates for consumption by the one or more texture units and to reorder texture values received from the one or more texture units.

19 Claims, 16 Drawing Sheets

(56) References Cited

U.S. PATENT DOCUMENTS

2014/0173258 A1 6/2014 Fahs et al.
2014/0184894 A1* 7/2014 Motta .......................... 348/362
2014/0240329 A1 8/2014 Tarjan

* cited by examiner

GRAPHICS PROCESSING UNIT WITH A TEXTURE RETURN BUFFER AND A TEXTURE QUEUE

FIELD OF THE INVENTION

The present invention relates to computer graphics, and more particularly to texture operations in graphics processing.

BACKGROUND

One of the fundamental operations of graphics processing units (GPUs) is texturing. A texture map is a source array of color values (i.e. texels) that may be mapped to a surface of a graphics object. For each pixel in a digital image, one or more texels in the texture map are sampled and filtered to produce a color value for the pixel. Texturing may be used to generate more realistic computer generated images of a three-dimensional model.

Sampling the texture map typically requires texel values to be fetched from memory. The memory operations may introduce latency into the texture operation, slowing down the graphics processing pipeline. Thus, there is a need for addressing this issue and/or other issues associated with the prior art.

SUMMARY

A processor and a system are provided for performing texturing operations loaded from a texture queue that provides temporary storage of texture coordinates and texture values. The processor includes a texture queue implemented in a memory of the processor, a crossbar coupled to the texture queue, and one or more texture units coupled to the texture queue via the crossbar. The crossbar is configured to reorder texture coordinates for consumption by the one or more texture units and to reorder texture values received from the one or more texture units.

DETAILED DESCRIPTION

Figure 1:
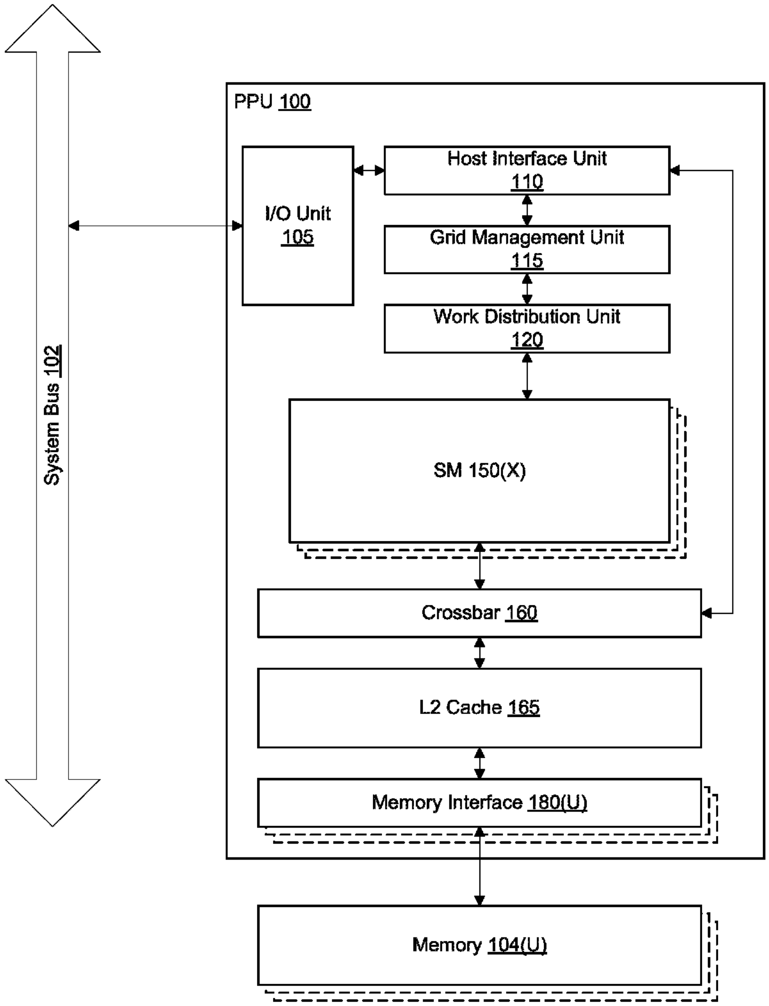
FIG. 1 illustrates a parallel processing unit, according to one embodiment.

FIG. 1 illustrates a parallel processing unit (PPU) 100, according to one embodiment. While a parallel processor is provided herein as an example of the PPU 100, it should be strongly noted that such processor is set forth for illustrative purposes only, and any processor may be employed to supplement and/or substitute for the same. In one embodiment, the PPU 100 is configured to execute a plurality of threads concurrently in two or more streaming multi-processors (SMs) 150. A thread (i.e., a thread of execution) is an instantiation of a set of instructions executing within a particular SM 150. Each SM 150, described below in more detail in conjunction with FIG. 2, may include, but is not limited to, one or more processing cores, one or more load/store units (LSUs), a level-one (L1) cache, shared memory, and the like.

In one embodiment, the PPU 100 includes an input/output (I/O) unit 105 configured to transmit and receive communications (i.e., commands, data, etc.) from a central processing unit (CPU) (not shown) over the system bus 102. The I/O unit 105 may implement a Peripheral Component Interconnect Express (PCIe) interface for communications over a PCIe bus. In alternative embodiments, the I/O unit 105 may implement other types of well-known bus interfaces.

The PPU 100 also includes a host interface unit 110 that decodes the commands and transmits the commands to the grid management unit 115 or other units of the PPU 100 (e.g., memory interface 180) as the commands may specify. The host interface unit 110 is configured to route communications between and among the various logical units of the PPU 100.

In one embodiment, a program encoded as a command stream is written to a buffer by the CPU. The buffer is a region in memory, e.g., memory 104 or system memory, that is accessible (i.e., read/write) by both the CPU and the PPU 100. The CPU writes the command stream to the buffer and then transmits a pointer to the start of the command stream to the PPU 100. The host interface unit 110 provides the grid management unit (GMU) 115 with pointers to one or more streams. The GMU 115 selects one or more streams and is configured to organize the selected streams as a pool of pending grids. The pool of pending grids may include new grids that have not yet been selected for execution and grids that have been partially executed and have been suspended.

A work distribution unit 120 that is coupled between the GMU 115 and the SMs 150 manages a pool of active grids, selecting and dispatching active grids for execution by the SMs 150. Pending grids are transferred to the active grid pool by the GMU 115 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 120. In addition to receiving grids from the host interface unit 110 and the work distribution unit 120, the GMU 110 also receives grids that are dynamically generated by the SMs 150 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 100. An application may include instructions (i.e., API calls) that cause the driver kernel to generate one or more grids for execution. In one embodiment, the PPU 100 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 100 comprises X SMs 150(X). For example, the PPU 100 may include 15 distinct SMs 150. Each SM 150 is multi-threaded and configured to execute a plurality of threads (e.g., 32 threads) from a particular thread block concurrently. Each of the SMs 150 is connected to a level-two (L2) cache 165 via a crossbar 160 (or other type of interconnect network). The L2 cache 165 is connected to one or more memory interfaces 180. Memory interfaces 180 implement 16, 32, 64, 128-bit data buses, or the like, for high-speed data transfer. In one embodiment, the PPU 100 comprises U memory interfaces 180(U), where each memory interface 180(U) is connected to a corresponding memory device 104(U). For example, PPU 100 may be connected to up to 6 memory devices 104, such as graphics double-data-rate, version 5, synchronous dynamic random access memory (GDDR5 SDRAM).

In one embodiment, the PPU 100 implements a multi-level memory hierarchy. The memory 104 is located off-chip in SDRAM coupled to the PPU 100. Data from the memory 104 may be fetched and stored in the L2 cache 165, which is located on-chip and is shared between the various SMs 150. In one embodiment, each of the SMs 150 also implements an L1 cache. The L1 cache is private memory that is dedicated to a particular SM 150. Each of the L1 caches is coupled to the shared L2 cache 165. Data from the L2 cache 165 may be fetched and stored in each of the L1 caches for processing in the functional units of the SMs 150.

In one embodiment, the PPU 100 comprises a graphics processing unit (GPU). The PPU 100 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 100 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 115 may configure one or more SMs 150 to execute a vertex shader program that processes a number of vertices defined by the model data. In one embodiment, the GMU 115 may configure different SMs 150 to execute different shader programs concurrently. For example, a first subset of SMs 150 may be configured to execute a vertex shader program while a second subset of SMs 150 may be configured to execute a pixel shader program. The first subset of SMs 150 processes vertex data to produce processed vertex data and writes the processed vertex data to the L2 cache 165 and/or the memory 104. After the processed vertex data is rasterized (i.e., transformed from three-dimensional data into two-dimensional data in screen space) to produce fragment data, the second subset of SMs 150 executes a pixel shader to produce processed fragment data, which is then blended with other processed fragment data and written to the frame buffer in memory 104. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 100 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 100 is embodied on a single semiconductor substrate. In another embodiment, the PPU 100 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 100 may be included on a graphics card that includes one or more memory devices 104 such as GDDR5 SDRAM. The graphics card may be configured to interface with a PCIe slot on a motherboard of a desktop computer that includes, e.g., a northbridge chipset and a southbridge chipset. In yet another embodiment, the PPU 100 may be an integrated graphics processing unit (iGPU) included in the chipset (i.e., Northbridge) of the motherboard.

Figure 2:
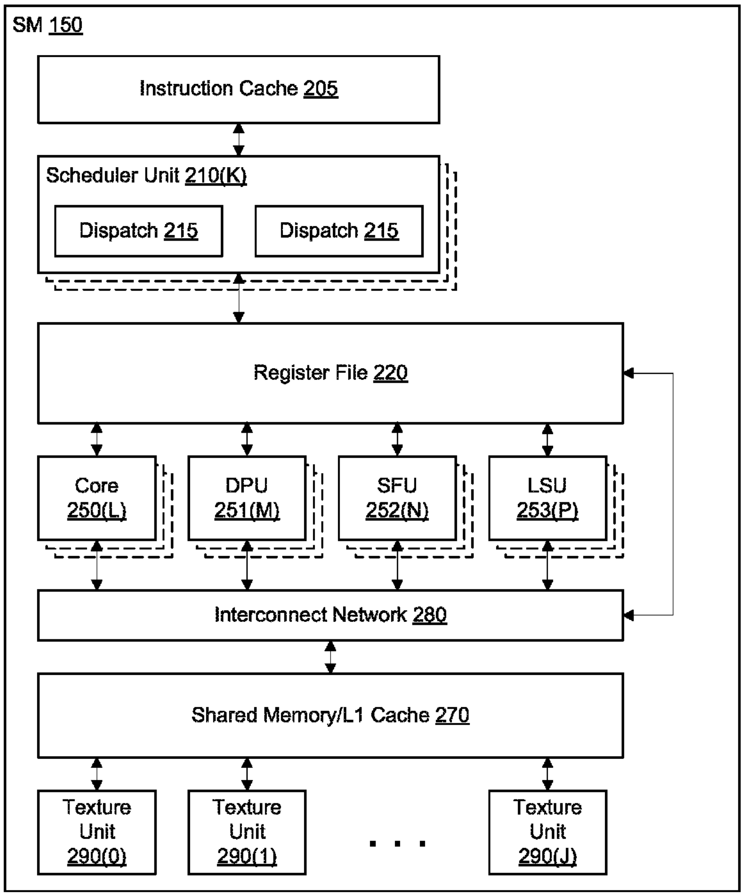
FIG. 2 illustrates the streaming multi-processor of FIG. 1, according to one embodiment.

FIG. 2 illustrates the streaming multi-processor 150 of FIG. 1, according to one embodiment. As shown in FIG. 2, the SM 150 includes an instruction cache 205, one or more scheduler units 210, a register file 220, one or more processing cores 250, one or more double precision units (DPUs) 251, one or more special function units (SFUs) 252, one or more load/store units (LSUs) 253, an interconnect network 280, a shared memory/L1 cache 270, and one or more texture units 290.

As described above, the work distribution unit 120 dispatches active grids for execution on one or more SMs 150 of the PPU 100. The scheduler unit 210 receives the grids from the work distribution unit 120 and manages instruction scheduling for one or more thread blocks of each active grid. The scheduler unit 210 schedules threads for execution in groups of parallel threads, where each group is called a warp. In one embodiment, each warp includes 32 threads. The scheduler unit 210 may manage a plurality of different thread blocks, allocating the thread blocks to warps for execution and then scheduling instructions from the plurality of different warps on the various functional units (i.e., cores 250, DPUs 251, SFUs 252, and LSUs 253) during each clock cycle.

In one embodiment, each scheduler unit 210 includes one or more instruction dispatch units 215. Each dispatch unit 215 is configured to transmit instructions to one or more of the functional units. In the embodiment shown in FIG. 2, the scheduler unit 210 includes two dispatch units 215 that enable two different instructions from the same warp to be dispatched during each clock cycle. In alternative embodiments, each scheduler unit 210 may include a single dispatch unit 215 or additional dispatch units 215.

Each SM 150 includes a register file 220 that provides a set of registers for the functional units of the SM 150. In one embodiment, the register file 220 is divided between each of the functional units such that each functional unit is allocated a dedicated portion of the register file 220. In another embodiment, the register file 220 is divided between the different warps being executed by the SM 150. The register file 220 provides temporary storage for operands connected to the data paths of the functional units.

Each SM 150 comprises L processing cores 250. In one embodiment, the SM 150 includes a large number (e.g., 192, etc.) of distinct processing cores 250. Each core 250 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 150 also comprises M DPUs 251 that implement double-precision floating point arithmetic, N SFUs 252 that perform special functions (e.g., copy rectangle, pixel blending operations, and the like), and P LSUs 253 that implement load and store operations between the shared memory/L1 cache 270 and the register file 220. In one embodiment, the SM 150 includes 64 DPUs 251, 32 SFUs 252, and 32 LSUs 253.

Each SM 150 includes an interconnect network 280 that connects each of the functional units to the register file 220 and the shared memory/L1 cache 270. In one embodiment, the interconnect network 280 is a crossbar that can be configured to connect any of the functional units to any of the registers in the register file 220 or the memory locations in shared memory/L1 cache 270.

In one embodiment, the SM 150 is implemented within a GPU. In such an embodiment, the SM 150 comprises J texture units 290. The texture units 290 are configured to load texture maps (i.e., a 2D array of texels) from the memory 104 and sample the texture maps to produce sampled texture values for use in shader programs. The texture units 290 implement texture operations such as anti-aliasing operations using mip-maps (i.e., texture maps of varying levels of detail). In one embodiment, the SM 150 includes 16 texture units 290.

The PPU 100 described above may be configured to perform highly parallel computations much faster than conventional CPUs. Parallel computing has advantages in graphics processing, data compression, biometrics, stream processing algorithms, and the like.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Modern GPUs support "programmable shading", which allows various shader programs to be configured to run on a large number of functional units (i.e., cores 250, DPUs 251, SFUs 252, and LSUs 253). GPUs typically have large register files to support a large number of hardware contexts. A hardware context comprises a set of registers for the shader program to read and write values related to the shader program, as well as other registers (and or memory locations) to hold information about the primitive which the instance of the shader program is acting upon.

Shader programs can contain texture operations. A texture operation typically samples a texture map using texture coordinates (e.g., s, t, etc.) to generate a final texture value for a fragment. Texture operations typically generate many accesses to off-chip memory, which are associated with significant latency. A texture map is an array of values that may be mapped to a fragment. For example, a texture map may contain a 2D array of color values that can be used to map a 2D image to a 3D surface of the primitive. The texture coordinates specify a point within the array from which a sample may be generated. Each texture operation writes a final texture value into one or more registers for the hardware context associated with the thread that generated the texture operation. The number of registers consumed by a single texture operation varies according to which type of texture operation the shader program implements and what type of texture map was accessed by the texture operation. Because shader programs are dependent on the values returned by the texture operations to continue executing, the shader programs are often stalled while waiting on long-latency memory access operations to complete.

Two techniques are used to reduce the time during which the execution units are idle. First, a compiler implemented by the driver kernel performs an optimization similar to load-hoisting, which moves the texture operations as early in the shader program as possible. In addition, the compiler attempts to arrange texture operations in a parallel manner. It will be appreciated that both of these optimizations increase the number of registers needed by the shader program because each of the parallel texture operations requires a set of registers to store return values, and performing texture operations earlier in the shader program requires the registers to be allocated earlier in time, such that additional registers are required for intervening operations unrelated to the texture operation. Second, the number of hardware contexts per execution unit is increased to enable context switching between several different hardware contexts. When a first hardware context is idled while waiting for a texture operation to complete, a different hardware context may be executed. Both of these techniques require additional registers for each execution unit, which increases the size of the GPU or reduces the number of execution units that can be placed on a die of a particular size.

Figure 3A:
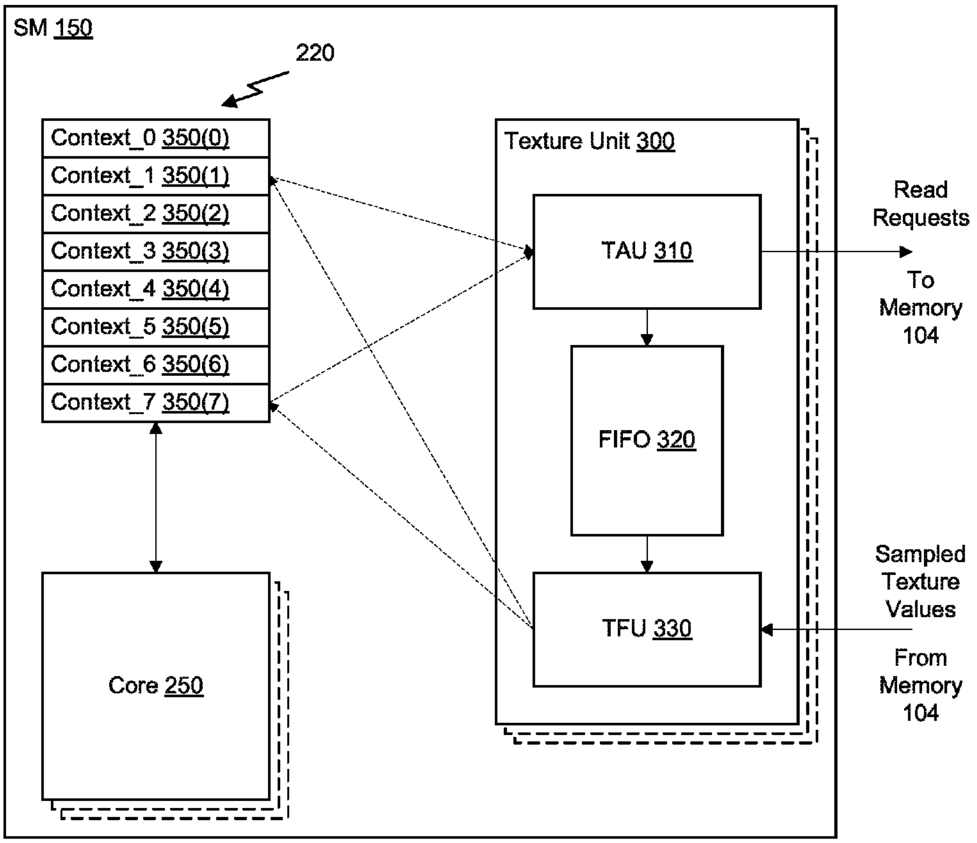
Fig. 3A (prior art)
FIGS. 3A & 3B illustrate the organization and operation of conventional texture units, in accordance with the prior art.
Figure 3B:
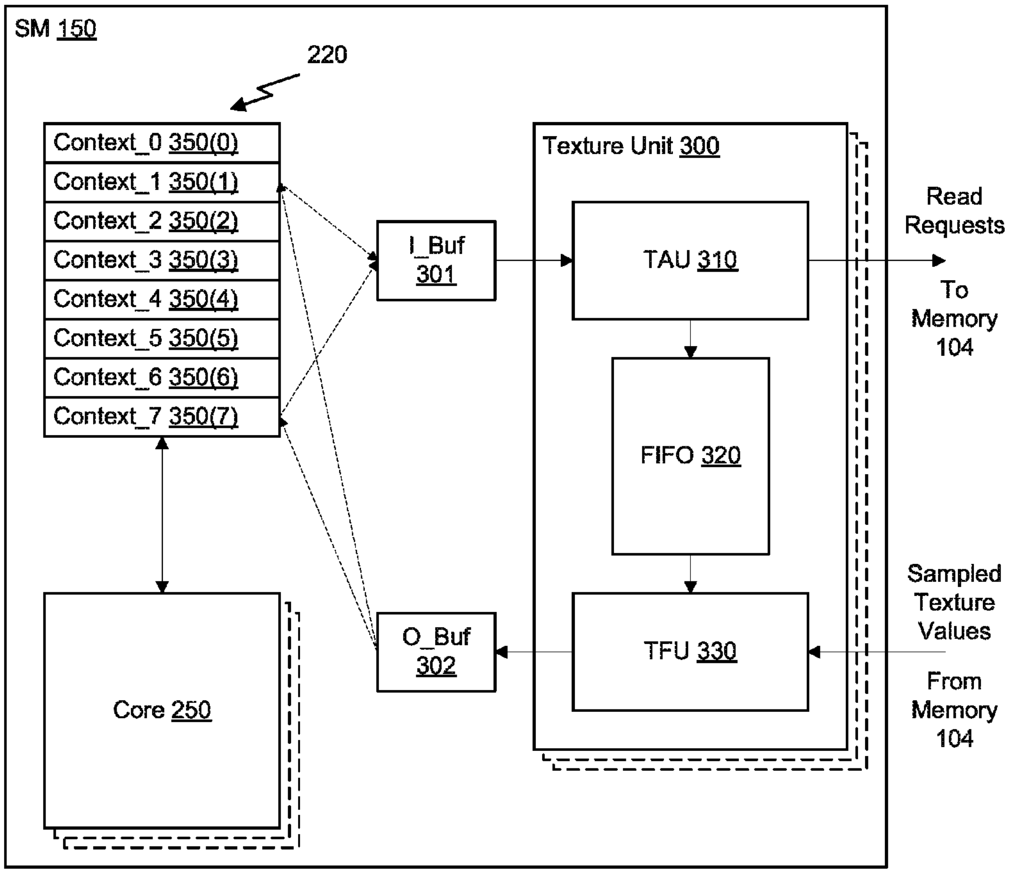
Fig. 3B (prior art)

FIGS. 3A & 3B illustrate the organization and operation of conventional texture units, in accordance with the prior art. As shown in FIG. 3A, a texture unit 300 includes a texture address unit (TAU) 310, a texture latency FIFO (i.e., First-In, First-Out) 320, and a texture filtering unit (TFU) 330. The TAU 310 receives one or more texture coordinates (e.g., s, t, etc.) and converts the texture coordinates into one or more physical addresses corresponding to the texture coordinates. The TAU 310 transmits one or more memory read requests to the memory subsystem to read values from memory corresponding to the one or more physical addresses. The TAU 310 also writes the one or more physical addresses as well as other information (i.e., information related to the primitive being textured, the hardware context that initiated the texture operation, the location in the register file 220 to write the final texture value, etc.) specified by the texture operation to the texture latency FIFO 320. The TFU 330 receives the sampled texture values read from memory based on the memory read requests transmitted to the memory subsystem by the TAU 310. Once the TFU 330 has received each of the sampled texture values associated with a texture operation in the texture latency FIFO 320, the TFU 330 pops the texture operation from the texture latency FIFO 320 and processes the sampled texture values to produce the final texture value (e.g., by linear interpolation, tri-linear interpolation, etc.). The texture latency FIFO 320 enables the TAU 310 and the TFU 330 to process different texture operations while the memory read requests are being processed by the memory subsystem. Texture operations are processed in the order in which the texture operations are received by the texture unit 300.

As described above, instances of a shader program are instantiated as groups of threads called thread blocks or warps. The warp comprises a number of parallel threads executing on different functional units of the SM 150. Each thread in a warp executes the instructions in the shader program on different input data, such as the vertices of a number of primitives. For example, a shader program may include a load (LD) instruction followed by a multiply (MUL) instruction. The scheduler unit 210 dispatches the LD instruction for a warp to a number of the LSUs 253, which load a value from the shared memory/L1 cache 270 into the register file 220. Once the value is loaded into the register file 220, the scheduler unit 210 dispatches the MUL instruction to a number of cores 250. For example, if the size of a warp is 32 threads, then the scheduler unit 210 may dispatch the LD instruction to 32 LSUs 253 during a first clock cycle and then dispatch the MUL instruction to 32 cores 250 during a subsequent clock cycle. The 32 LSUs 253 will load 32 values into 32 different registers of the register file 220. The 32 cores 250 then consume the 32 values to produce 32 results that are stored into another 32 registers of the register file 220.

Texture operations are processed by one or more of the functional units of the SM 150. For example, a shader program may include one or more LD instructions that load texture coordinates into registers of the register file, one or more arithmetic instructions (e.g., MUL, ADD, etc.) that may transform the texture coordinates, and a texture (TEX) instruction that samples a texture map to generate a final textured value based on the texture coordinates. The scheduler unit 210 dispatches the one or more LD instructions to a set of LSUs 253 to retrieve the texture coordinates from shared memory/L1 cache 270, dispatches the one or more arithmetic instructions to a set of cores 250 to generate transformed texture coordinates, and dispatches the TEX instruction to a set of texture units 300 to generate final texture values. The cores 250 read the texture coordinates from the register file 220 and, optionally, may transform the texture coordinates to generate transformed texture coordinates, which are stored in the register file 220. Then, the texture units 300 read the texture coordinates (or transformed texture coordinates) from the register file 220 and generate one or more physical addresses that identify locations within the texture map to sample to generate one or more sampled values of the texture map. The one or more sampled values may then be processed by the TFU 330 to generate a final texture value.

The TAU 310 reads the texture coordinates from registers in the register file 220 associated with the hardware context that originated the TEX instruction. As shown in FIG. 3A, a first texture operation received by the texture unit 300 is originated by a warp associated with a first hardware context (i.e., Context_1 350(1)) and a second texture operation received by the texture unit 300 is originated by a warp associated with a second hardware context (i.e., Context_7 350(7)). Texture unit 300 receives the first texture operation and reads the texture coordinates from registers associated with the first hardware context (i.e., Context_1 350(1)). The TAU 310 generates the one or more physical addresses for the first texture operation, transmits one or more memory read requests to the memory subsystem, and adds the first texture operation to the texture latency FIFO 320. The texture unit 300 subsequently receives the second texture operation and reads the texture coordinates from registers associated with the second hardware context (i.e., Context_7 350(7)). The TAU 310 generates the one or more physical addresses for the second texture operation, transmits one or more memory read requests to the memory subsystem, and adds the second texture operation to the texture latency FIFO 320. Once the sampled values for the first texture operation have been returned by the memory subsystem, the TFU 330 pops the first texture operation from the texture latency FIFO 320 and generates a final texture value, which is stored in registers in the register file 220 associated with the first hardware context (i.e., Context_1 350(1)). Once the sampled values for the second texture operation have been returned by the memory subsystem, the TFU 330 pops the second texture operation from the texture latency FIFO 320 and generates a final texture value, which is stored in registers in the register file 220 associated with the second hardware context (i.e., Context_7 350(7)).

Because the compiler cannot know when the final texture value will be generated by the texture unit 300, one or more registers are allocated to store the final texture value when the TEX instruction is transmitted to the texture unit 300. The addresses for these registers are then passed to the texture unit 300 (or a texture interface unit) so that the TFU 330 knows where to store the final values when the texture operation is complete. It will be appreciated that the number of registers that are allocated for an instance of the shader program may become quite large, especially when the shader program implements a number of texture operations in parallel.

One hardware organization utilizes a different number of cores 250 configured to process instructions from a warp than the number of texture units 300 configured to process instructions from a warp. For example, 16 cores 250 may be configured to process a MUL instruction from a particular warp, with half of the threads of the warp executing in parallel during a first clock cycle and the other half of the threads of the warp executing in parallel during a second clock cycle. However, 8 texture units 300 may be configured to process a TEX instruction from a warp, with each texture unit generating texture values for four threads of the warp. Because a warp may include a different number of threads than texture units 300 configured to process the TEX instruction for a warp, the texture operation may be broken up into a set of texture operations with each texture operation from the set of texture operations configured to generate final texture values for a different subset of threads in the warp.

As shown in FIG. 3B, an input buffer 301 and an output buffer 302 may be coupled to one or more texture units 300 to perform swizzling operations. A swizzling operation is an operation that reorders the components of an array. For example, a warp may include a TEX instruction that is executed for 32 parallel threads. In this example, the texture coordinates are stored in groups of 32 values for each texture coordinate, which corresponds to the size of the warp. In other words, the set of texture units 300 configured to process a texture operation would receive 32 s coordinates followed by 32 t coordinates and so forth. However, the number of texture units 300 configured to perform a texture operation for a warp may be different than 32. Thus, the input buffer (I_Buf) 301 receives the texture coordinates and reorders the texture coordinates, grouping a first subset of the s coordinates with a corresponding first subset of the t coordinates for a first texture operation, grouping a second subset of the s coordinates with a corresponding second subset of the t coordinates for a second texture operation, and so forth. The output buffer (O_Buf) 302 performs a similar operation in reverse (i.e., unswizzling), which buffers a first subset of final texture values, a second subset of final texture values, and so forth to generate a set of final texture values that corresponds to the width of a warp (e.g., 32 final texture values) so that the final texture values can be consumed in parallel by the set of cores 250 in a subsequent instruction of the warp. The input buffer 301 and the output buffer 302 decouple the number of texture units 300 which perform a parallel texture operation from the number of cores 250 that generate the texture coordinates or consume the final texture values.

Figure 4:
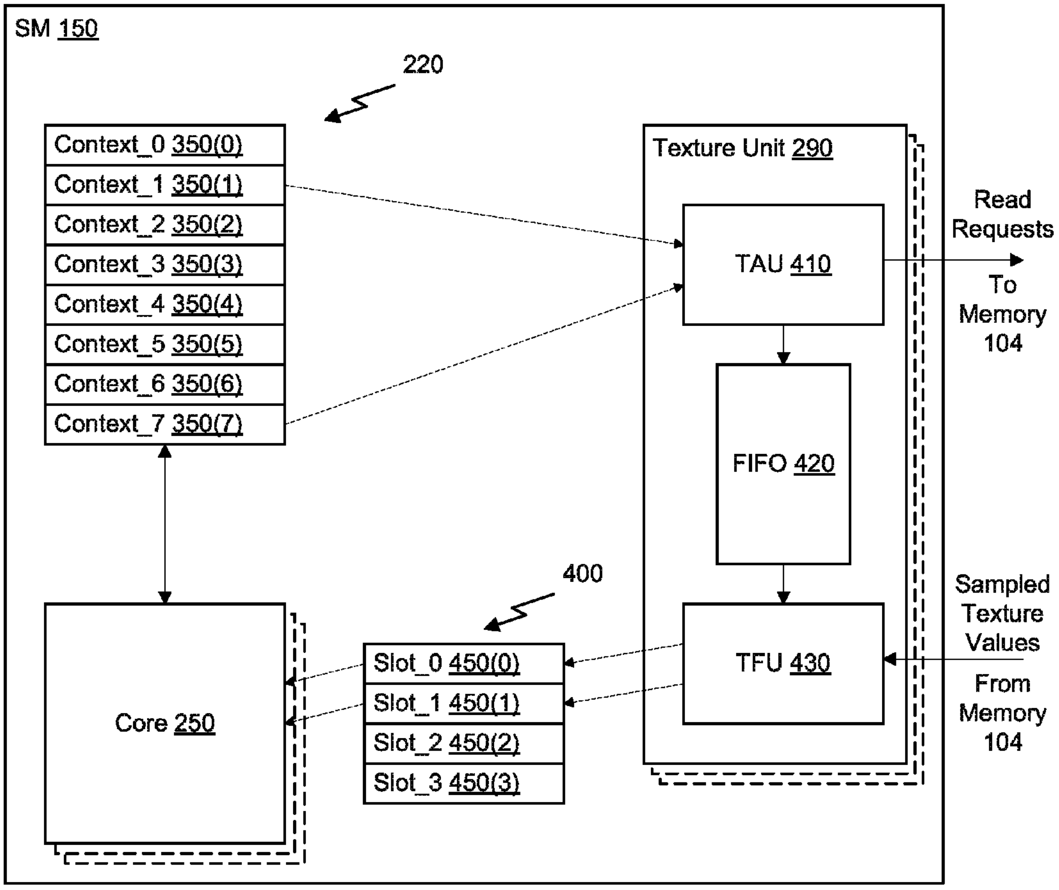
FIG. 4 illustrates the organization and operation of the texture units of FIG. 2, according to one embodiment.

FIG. 4 illustrates the organization and operation of the texture units 290 of FIG. 2, according to one embodiment. Texture unit 290 is similar to texture unit 300, described above, except as otherwise noted below. Specifically, TAU 310 is similar to TAU 410, texture latency FIFO 320 is similar to texture latency FIFO 420, and TFU 330 is similar to TFU 430. As shown in FIG. 4, the SM 150 includes a texture return buffer (TRB) 400 that provides temporary storage for final texture values produced by the texture unit 290. In one embodiment, the TRB 400 is a small buffer that is included in SM 150 in addition to the register file 220 and the shared memory/L1 cache 270. The TRB 400 includes a number of slots 450 that store final texture values produced by the TFU 430 of texture unit 290. Instead of writing the final texture value to a register in register file 220, which must be allocated when the texture operation is initiated, the TFU 430 writes the final texture value to an empty slot in the TRB 400 when the final texture value is generated by the TFU 430. A texture identifier passed to the TFU 430 as part of the texture operation is associated with an entry identifier for the slot of the TRB 400, described in more detail below. The cores 250 may then read the final texture value directly from the TRB 400 rather than from a register in the register file 220. As the shader program consumes the final texture value from the TRB 400, the shader program notifies the TRB 400 that the slot 450 storing the final texture value can be deallocated and used to store a final texture value from a subsequent texture operation.

The benefit of the TRB 400 is that entries are allocated and deallocated when the final texture values are produced and consumed. This hardware organization enables a smaller register file 220 to provide the same performance as larger register files 220 associated with the hardware organization set forth in FIGS. 3A and 3B. Furthermore, decoupling the TRB 400 from the texture unit 290 enables the TFU 430 to continue to generate additional final texture values for subsequent texture operations while the preceding final texture values are being consumed.

In one embodiment, an instruction set of the SM 150 is expanded to include a new type of identifier for texture values. Texture identifiers are handles (i.e., an unsigned integer) that are associated with the output of a texture operation. With respect to the instructions, texture identifiers are similar to normal registers, but texture identifiers can only be used as input operands for all instructions except texture instructions and can only be used as output operands for texture instructions. However, texture identifiers are different from normal registers in that only texture operations can use the texture identifiers as output operands. When a texture operation is initiated by a hardware context 350, the texture identifier is transmitted to the texture unit 290 and passed to the TFU 430 in the texture latency FIFO 420. When the TFU 430 generates a final texture value, the value is stored in a slot of the TRB 400 and the address of the slot is associated with the texture identifier.

In one embodiment, the TRB 400 is implemented in a portion of the register file 220. For example, a 1 KB portion of registers in the register file 220 may be allocated to store entries in the TRB 400. In one embodiment, the size of the TRB 400 may be changed dynamically. Between different shader programs, the driver kernel can adjust the allocation of the register file 220 to change the capacity of the TRB 400. For example, some shader programs may generate a large number of texture operations that may benefit from a larger TRB 400, while other shader programs may generate fewer texture operations that benefit from a larger number of registers allocated to each hardware context. Allocating registers from the register file 220 to implement the TRB 400 does not require an explicit buffer to be designed into the SM 150 and takes advantage of storage resources that are already available in a conventional processor design. In another embodiment, the TRB 400 may be allocated as a part of shared memory/L1 cache 270.

Storing final texture values in the TRB 400 may be more efficient than storing texture values directly to the hardware contexts of the register files. However, care should be taken that the TRB 400 is efficiently drained by the active warps executing within the SMs 150. In one embodiment, a wake-up signal may be sent to a scheduler, such as scheduler unit 210, when a texture value is generated and stored in the TRB 400 that indicates that the warp that sent the texture request associated with that texture value should be woken up as soon as possible to consume the texture value. Efficient scheduling can alleviate the problem of the TRB 400 filling up and causing the texture unit 290 to idle.

Figure 5:
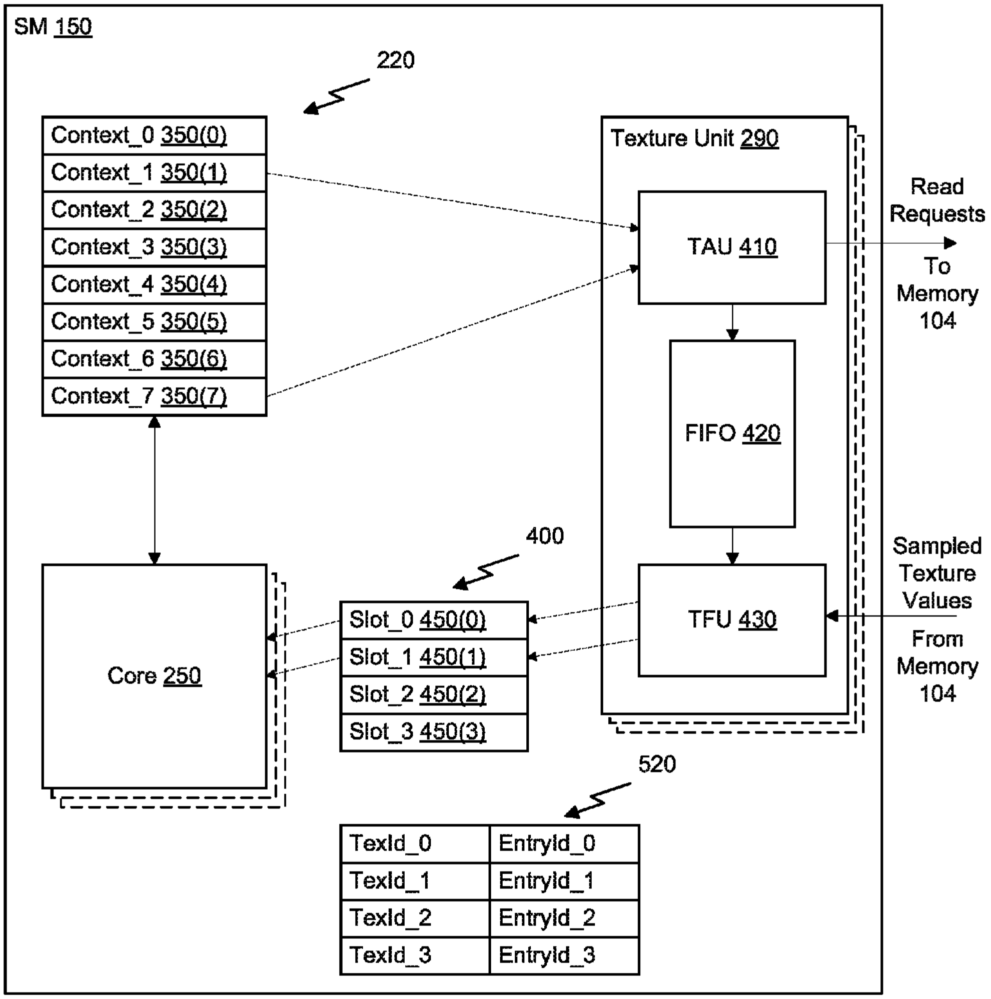
FIG. 5 illustrates a texture identifier mapping table, according to one embodiment.

FIG. 5 illustrates a texture identifier mapping table 520, according to one embodiment. As shown in FIG. 5, the SM 150 includes a texture identifier mapping (TIM) table 520 that stores entries that associate texture identifiers with entry identifiers for slots in the TRB 400. When the TFU 430 writes a final texture value to the TRB 400, the TFU 430 also associates the texture identifier corresponding to the texture operation with an entry identifier that references the slot in the TRB 400 where the final texture value is stored. The entry identifiers are addresses for the slot of the TRB 400. When an instruction in the shader program uses a texture identifier as an operand, the TIM table 520 is used by the core 250 to look up the slot in the TRB 400 that stores the final texture value.

In one embodiment, the texture identifier is passed to the texture unit 290 as a part of the texture operation. The texture unit 290 tracks the texture identifier throughout the texture operation and, when the final texture value is written to the TRB 400, an entry is added to the TIM table 520, which indicates that the final texture value is ready to be consumed by the thread that generated the texture operation. In another embodiment, the texture unit 290 may transmit a signal to the scheduler unit 210 to indicate that the final texture value is ready to be consumed.

In one embodiment, an instruction that reads a value in the TRB 400 includes a last use bit that is set in the instruction to indicate that the shader program will no longer access the final texture value in the TRB 400. When the last use bit is set, the entry in the TIM table 520 will be invalidated (i.e., removed) indicating that the slot in the TRB 400 can be deallocated and used for the next texture operation. Another table, not shown, may be used to track the free (i.e., deallocated) entries of the TRB 400. A TRB free list table is a queue which holds all of the entry identifiers for the slots of the TRB 400 which are not currently associated with a texture value. In other words, when the TFU 430 generates a new final texture value, an entry identifier may be removed from the TRB free list table and allocated to that texture operation. If the TRB free list table is empty, then the TFU 430 stalls until an entry has been deallocated due to consumption of a final texture value by a currently executing shader program.

In one embodiment, a spill buffer may be allocated in memory 104 to avoid deadlock conditions when the TRB 400 is full. In such an embodiment, additional slots of the TRB 400 may be allocated in the spill buffer in memory and loaded to the TRB 400 as the texture identifiers associated with texture values stored in the spill buffer are accessed. The implementation of the spill buffer prevents the TRB 400 from stalling the texture unit 290 because there are no free entries available in the TRB 400.

Figure 6A:
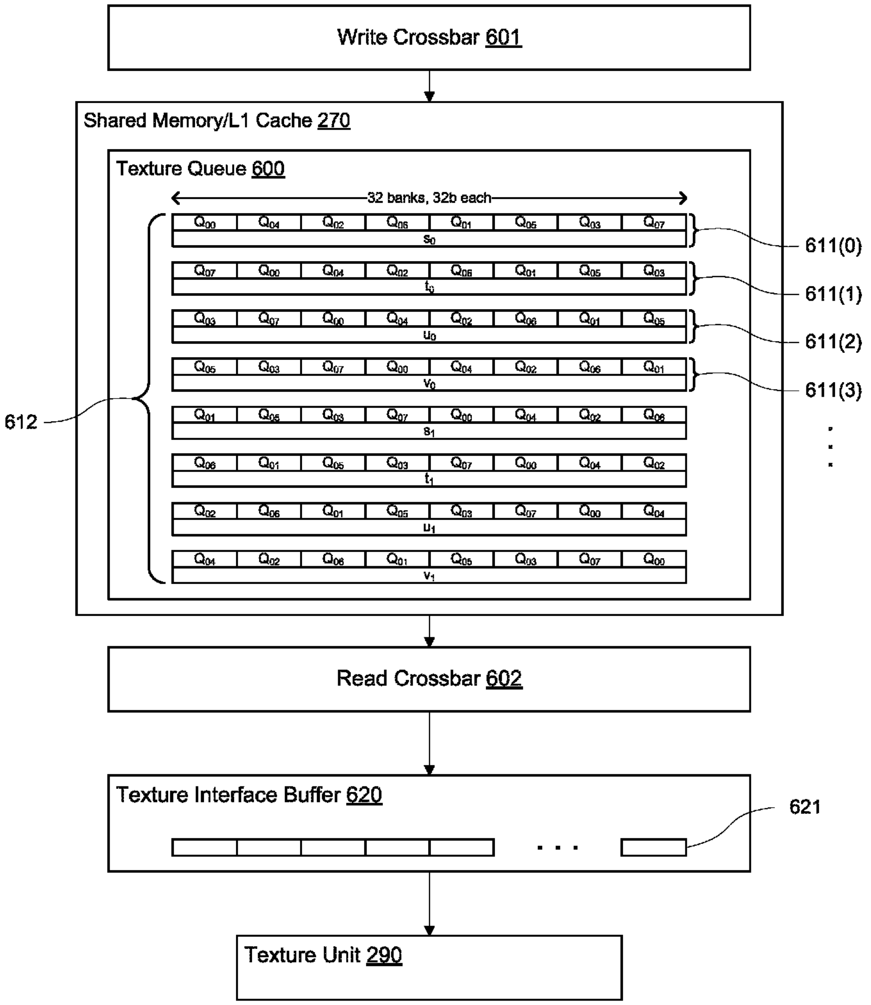
FIG. 6A illustrates a texture queue implemented within a shared memory/L1 cache, according to one embodiment.

FIG. 6A illustrates a texture queue 600 implemented within a shared memory/L1 cache 270, according to one embodiment. A portion of the shared memory/L1 cache 270 may be allocated by the driver kernel to be used as a texture queue 600 for arranging texture coordinates to be transmitted to the texture units 290 and for storing texture values generated by the texture units 290. For example, in one embodiment, a shared memory/L1 cache 270 for an SM 150 is 64 KB in size, and a 4 KB portion of the shared memory/L1 cache 270 may be allocated to the texture queue 600. The texture queue 600 may be implemented across a number of memory banks, each memory bank having a width of 4 bytes (i.e., 32 bits). The scheduler unit 210 may reserve space 612 in the texture queue 600 in order to provide a location for texture coordinates to be stored before being transmitted to the texture units 290 as part of a texture operation. As shown in FIG. 6A, the number of memory banks may be, e.g., 32 memory banks. In alternative embodiments, the number of memory banks may be 16, 64, 10, or some other number of memory banks.

A pixel tile is a two-dimensional array of pixels associated with an image, such as a 16 pixel by 16 pixel array. In different embodiments, pixel tiles may be different sizes (e.g., 8×8, 16×16, 8×16, 32×32, etc.), per the desires of the user. A pixel tile may be covered, fully or partially, by some number of graphics primitives (i.e., triangles, triangle strips, etc.). The one or more texture operations may be implemented for each of the graphics primitives that covers a particular pixel tile. In other words, a batch of texture operations is executed for the covered quads in each pixel tile of an image. One or more warps may be generated that correspond to the covered quads of a pixel tile. The warps are executed by the PPU 100.

A batch of texture operations includes one or more texture instructions, with each texture instruction including one or more texture coordinates as operands. For example, a batch of texture operations may comprise a first texture instruction (i.e., TEX $s_0$, $t_0$, $u_0$, $v_0$) having four texture coordinates as operands and a second texture instruction (i.e., TEX $s_1$, $t_1$, $u_1$, $v_1$) having four texture coordinates as operands. In order to execute the batch of texture operations, the texture coordinates associated with the batch of texture operations are stored in the texture queue 600 before being transmitted to the texture units 290 for processing. As shown in FIG. 6A, in one embodiment, texture coordinates for a plurality of quads are stored in the texture queue 600. The particular arrangement of texture coordinates within the texture queue 600 does not necessarily match the order that texture coordinates are transmitted to the texture units 290, as will be discussed more fully below. The number of quads stored in the texture queue 600 is dependent on the size of a pixel tile for a particular batch of texture operations.

A write crossbar 601 and a read crossbar 602, which are included in the interconnect network 280 of SM 150, are coupled to the shared memory/L1 cache 270 and may be configured to connect the texture queue 600 to other units within the SM 150. The write crossbar 601 and the read crossbar 602 may have a width of arbitrary size, and the number of texture coordinates that may be written to or read from the texture queue 600 in a single clock cycle is dependent on the widths of the write crossbar 601 and the read crossbar 602. Although shown as separate and distinct units in FIGS. 6A-6G, the write crossbar 601 and the read crossbar 602 may be considered as a single unit having separate circuitry that functions as the separate and distinct units described herein. In yet another embodiment, a single crossbar may be implemented that may be configured to perform the functions of either the write crossbar 601 or the read crossbar 602, as required.

It will be appreciated that only one texture coordinate may be written to or read from each memory bank during a given clock cycle. In one embodiment, the write crossbar 601 and the read crossbar 602 have a width of 1024 bits, such that one value from each of the 32 memory banks may be written or read during a given clock cycle. In other embodiments, the widths of the write crossbar 601 and the read crossbar 602 may be some other value including, but not limited to, 128, 256, or 512 bits in width. It will be appreciated that in some embodiments, multiple values may be stored in one slot of a memory bank (e.g., two 16 bit values may be stored in one 32 bit slot). In such embodiments, more than one value may be read from each memory bank per clock cycle. In yet other embodiments, the width of a memory bank may be greater than or less than 32 bits, such as 16 bits or 64 bits, and one or more values may be read from each memory bank per clock cycle.

In one embodiment, a texture interface buffer 620 may be included within the SM 150 as an interface between the texture units 290 and the texture queue 600. The texture interface buffer 620 provides a small buffer 621 (e.g., 512 bytes) for properly ordering texture coordinates for transmission to the texture units 290. A portion of the texture coordinates may be loaded from the texture queue 600 into the slots 621 of the texture interface buffer 620 via the read crossbar 602. The texture interface buffer 620 enables all of the data for a texture operation to be loaded from memory into the texture units 290 in a single operation. Alternatively, the texture units 290 could receive the data for a texture operation over multiple cycles using multiple memory operations. However, scheduling multiple memory operations may be more complicated and tie up the memory unit over multiple clock cycles thereby preventing the memory unit from processing other memory requests. For example, if the transfer of texture coordinates from the memory 104 to the texture interface buffer 620 uses only some of the memory banks, and other types of memory access requests are being interleaved between memory access requests for the texture coordinates, then scheduling memory requests transmitted to the memory 104 is more complicated. In other embodiments, the texture interface buffer 620 may include memory sufficient to store texture coordinates for two or more texture operations. Thus, one set of texture coordinates may be transmitted to the texture units 290 while one or more additional sets of texture coordinates are stored in (and possibly being drained from) the texture interface buffer 620.

In one embodiment, the texture units 290 may have an input interface that is 512 bits wide, which routes up to 16 texture coordinates for one quad to the texture pipeline (i.e., the TAU 410, the texture latency FIFO 420, and the TFU 430) in the texture units 290 to generate four texture values for the quad. The texture interface buffer 620 enables a subset of the texture coordinates within the texture queue 600 to be grouped and ordered according to the configuration of the input interface of the texture unit 290. The texture queue 600, in conjunction with the texture interface buffer 620, eliminates the need for the input buffer 301 of FIG. 3B for performing swizzling operations. Even if the input buffer 301 is not eliminated completely, the texture queue 600 enables the input buffer 301 to be greatly reduced in size and circuit complexity.

In some embodiments, the texture interface buffer 620 is not included within an SM 150, and the texture units 290 are configured to drain texture coordinates directly from the texture queue 600 via the read crossbar 602. In such embodiments, care should be taken that each of the texture coordinates for a given texture operation are stored in different memory banks of the texture queue 600. If two texture coordinates for a single texture operation are stored in the same memory bank, then it could be impossible to read out those texture values in a minimum number of clock cycles, decreasing the efficiency of the texture operation.

In one embodiment, a flag is set when each of the texture coordinates for a batch of texture operations has been stored in the texture queue 600. The flag indicates when the texture coordinates are ready to be drained to the texture units 290 and processed to generate texture values. Because texture coordinates are not drained from the texture queue 600 until the entire batch has been stored, the order that texture coordinates are stored in the texture queue 600 is irrelevant. However, the order that texture coordinates are drained from the texture queue 600 is important, because the texture values written back to the texture queue 600, in order, corresponds to the order of the texture coordinates drained from the texture queue 600. In another embodiment, additional state information may track which texture coordinates from the batch of texture operations have been loaded into the texture queue 600. The state information enables partial draining of the texture coordinates to the texture units 290 to generate texture values while the remaining texture coordinates are stored in the texture queue 600. Texture values generated by the texture units 290 are stored in locations in the texture queue 600 that correspond to, but are not necessarily the same as, the storage locations for the texture coordinates drained from the texture queue 600 to produce the texture values.

The operation of the texture queue 600 is described as follows. The texture queue 600 stores texture coordinates for a batch of texture operations for a pixel tile. In order to process a batch of texture operations for a particular pixel tile, the scheduler unit 210 reserves a space 612 in the texture queue 600 to store the texture coordinates associated with the batch. The space 612 comprises one or more slots 611 of memory within the texture queue 600 that store the texture coordinates for the batch of texture operations. As used herein, a slot 611 of memory may be a plurality of bits spread across a number of memory banks (e.g., 1024 bits spread across 32 memory banks). As shown in FIG. 6A, a first s-coordinate ($s_0$) may be stored in a first slot 611(0) of the texture queue 600, a first t-coordinate ($t_0$) may be stored in a second slot 611(1) of the texture queue 600, and so forth.

In one embodiment, the scheduler unit 210 transmits commands to the LSUs 253 that cause the LSUs 253 to store the texture coordinates (e.g., $s_0$, $t_0$, $u_0$, $v_0$, $s_1$, $t_1$, $u_1$, and $v_1$) for a plurality of quads in the space 612 reserved in the texture queue 600. Once all of the texture coordinates for the batch of texture operations for a pixel tile have been stored in the texture queue 600, the batch of texture operations may be flagged as ready. In one embodiment, a register for a hardware context associated with the batch of texture operations may include one or more bits that indicate that the batch of texture operations is ready to be transmitted to the texture units 290. The scheduler unit 210 then transmits commands to the texture units 290 to drain the texture coordinates from the texture queue 600. Once all of the texture coordinates have been drained from the texture queue 600 for processing by the texture units 290, the space 612 reserved for the texture coordinates may be released by the scheduler unit 210 and used for another batch of texture operations.

The texture units 290 drain the texture coordinates from the texture queue 600 and process the texture coordinates to generate a plurality of texture values. The scheduler unit 210 may reserve another space in the texture queue 600 for storing the plurality of texture values. The output of the texture units 290 is then stored in the other reserved space, described more fully below in conjunction with FIGS. 7A and 7B. In some embodiments, two distinct texture queues 600 may be implemented in an SM 150, a first texture queue dedicated to storing texture coordinates for consumption by the texture units 290 and a second texture queue dedicated to storing texture values generated by the texture units 290. Descriptions for the structure and operation of a single texture queue 600 are equally applicable to a dual texture queue implementation, with the operations and structure relating to texture coordinates associated with the first texture queue and the operations and structure relating to texture values associated with the second texture queue. It will be appreciated that implementations with two separate and distinct texture queues are technically equivalent to implementations having a single texture queue with enough memory to store both texture coordinates and texture values simultaneously (i.e., a first portion of memory for storing texture coordinates for one batch of texture operations and a second portion of memory for storing texture values for the batch of texture operations).

When all of the texture values for the batch of texture operations have been stored in the texture queue 600, the texture values for the batch of texture operations may be flagged as ready to be consumed by the threads of the warps for the pixel tile. The scheduler unit 210 may transmit commands included in the shader program that originated the texture operations to the LSUs 253 to load the texture values from the texture queue 600 as needed. Once all of the texture values for the batch of texture operations have been consumed, the space reserved for the texture values may be released and used for another batch of texture operations.

It will be appreciated that more than one space 612 may be reserved within the texture queue 600 for texture coordinates associated with two or more batches of texture operations for one or more pixel tiles at any one time. The number of texture operations in a batch may be specified within instructions in a shader program. The scheduler unit 210 tracks how many warps are allocated to a particular pixel tile and can schedule texture operations for each batch of texture operations based on the information in the instructions of the shader program. For example, the scheduler unit 210 may reserve a first space within the texture queue 600 for a first batch of texture operations. Before all of the texture coordinates have been stored in the first space, the scheduler unit 210 may reserve a second space within the texture queue 600 for a second batch of texture operations. Similarly, more than one space within the texture queue 600 may be reserved to store texture values associated with two or more batches of texture operations for one or more pixel tiles. Storing texture coordinates into and consuming texture values from the texture queue 600 may be performed in order (i.e., in first-in, first-out order) or out of order, per the desires of the user.

Figure 6B:
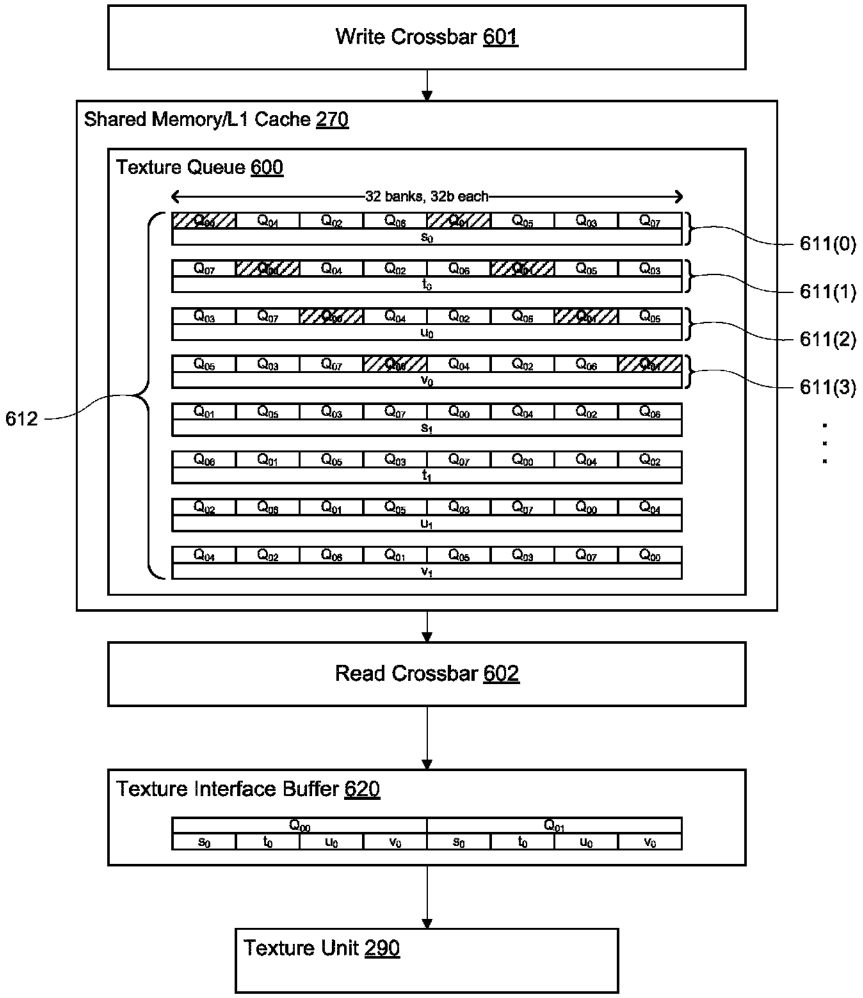
FIGS. 6B & 6C illustrate two different modes for draining texture coordinates from the texture queue, in accordance with one embodiment.
Figure 6C:
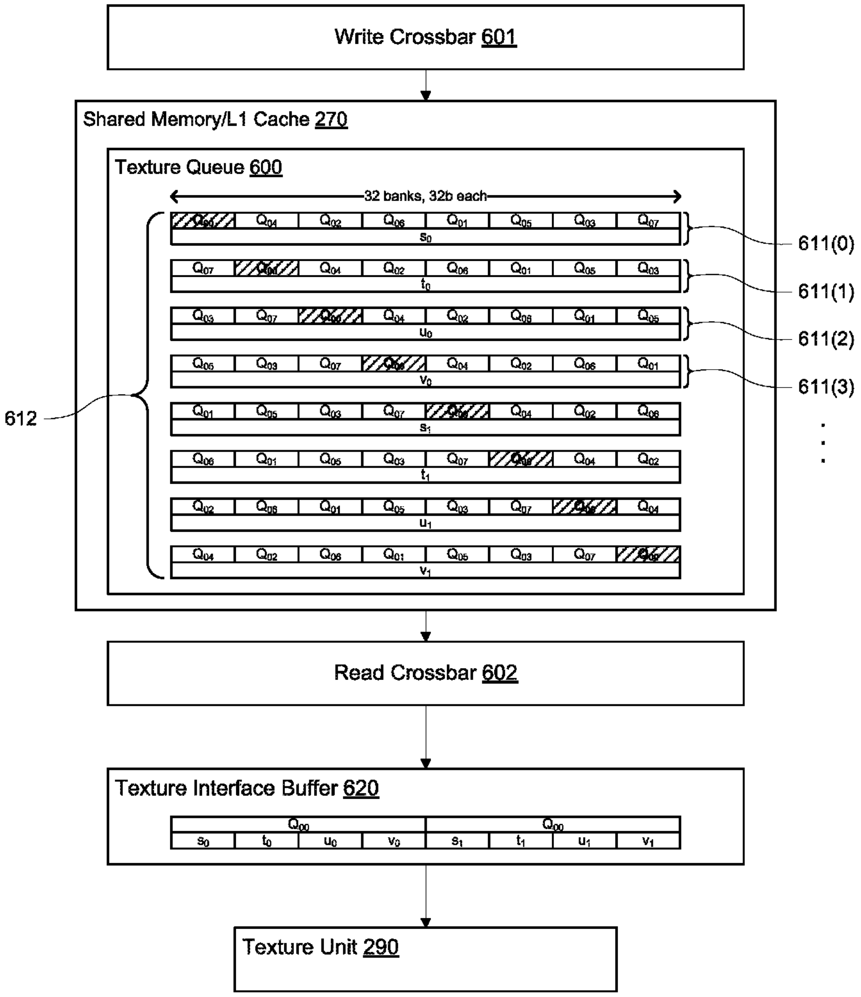

FIGS. 6B & 6C illustrate two different modes for draining texture coordinates from the texture queue 600, in accordance with one embodiment. The texture unit 290 may be configured to drain texture coordinates from the texture queue 600 according to a particular order. In one embodiment, as shown in FIG. 6B, texture coordinates may be drained from the texture queue 600 according to a TexTile priority mode. In the TexTile priority mode, the texture units 290 are configured to drain texture coordinates for a first texture operation for each of the quads in each of the warps for a pixel tile, in order. Then, the texture units 290 are configured to drain texture coordinates for a second texture operation for each of the quads in each of the warps for the pixel tile, in order, and so forth until all of the texture coordinates associated with the batch of texture operations have been drained from the texture queue 600. In other words, the texture coordinates for a first texture operation (i.e., $s_0$, $t_0$, $u_0$, $v_0$) for a first quad ($Q_{00}$) and a second quad ($Q_{01}$) are loaded into the texture interface buffer 620 and transmitted to the texture units 290 to generate texture values. Then, the texture coordinates for the first texture operation for a third quad ($Q_{02}$) and a fourth quad ($Q_{03}$) are loaded into the texture interface buffer 620 and transmitted to the texture units 290 to generate texture values, and so forth. Texture coordinates for each of the quads of the pixel tile are loaded into the texture interface buffer 620 and transmitted to the texture units 290 to generate texture values. Then, the process is repeated for the texture coordinates for a second texture operation (i.e., $s_1$, $t_1$, $u_1$, $v_1$) for each of the quads of the pixel tile. The TexTile priority mode increases the efficiency of texture operations by maximizing texture cache locality for each texture (i.e., because different texture operations may reference different texture maps). Although the embodiments of FIGS. 6B & 6C illustrate two quads being loaded into the texture interface buffer 620 at a time, it will be appreciated that the number of quads loaded at a time is dependent on the number of texture coordinates per thread (i.e., per fragment), the width of the texture interface buffer 620, and the input interface for the texture units 290. In other embodiments, a different number of quads may be loaded concurrently based on the particular architecture implemented by the SM 150.

In another embodiment, as shown in FIG. 6C, texture coordinates may be drained from the texture queue 600 according to a QuadTex priority mode. In the QuadTex priority mode, the texture units 290 are configured to drain texture coordinates for each of the texture operations in the batch of texture operations, in order, for a first quad. Then, the texture units 290 are configured to drain texture coordinates for each of the texture operations, in order, for a second quad, and so forth until all of the texture coordinates associated with the batch of texture operations have been drained from the texture queue 600. In other words, the texture coordinates for each of the quads of the pixel tile (i.e., $Q_{00}$, $Q_{01}$, $Q_{02}$, $Q_{03}$, and so forth) are loaded into the texture interface buffer 620 and transmitted to the texture units 290, in order, to generate texture values. It will be appreciated that as many quads as will fit in the texture interface buffer 620 may be loaded into the texture interface buffer 620, in parallel, and then the quads in the texture interface buffer 620 may be loaded serially into the texture units 290. The QuadTex priority mode increases the efficiency of texture operations by maximizing texture cache locality for each quad when multiple texture operations reference the same texture map. The QuadTex priority mode may increase efficiency in certain operations such as calculating soft shadows.

Figure 6D:
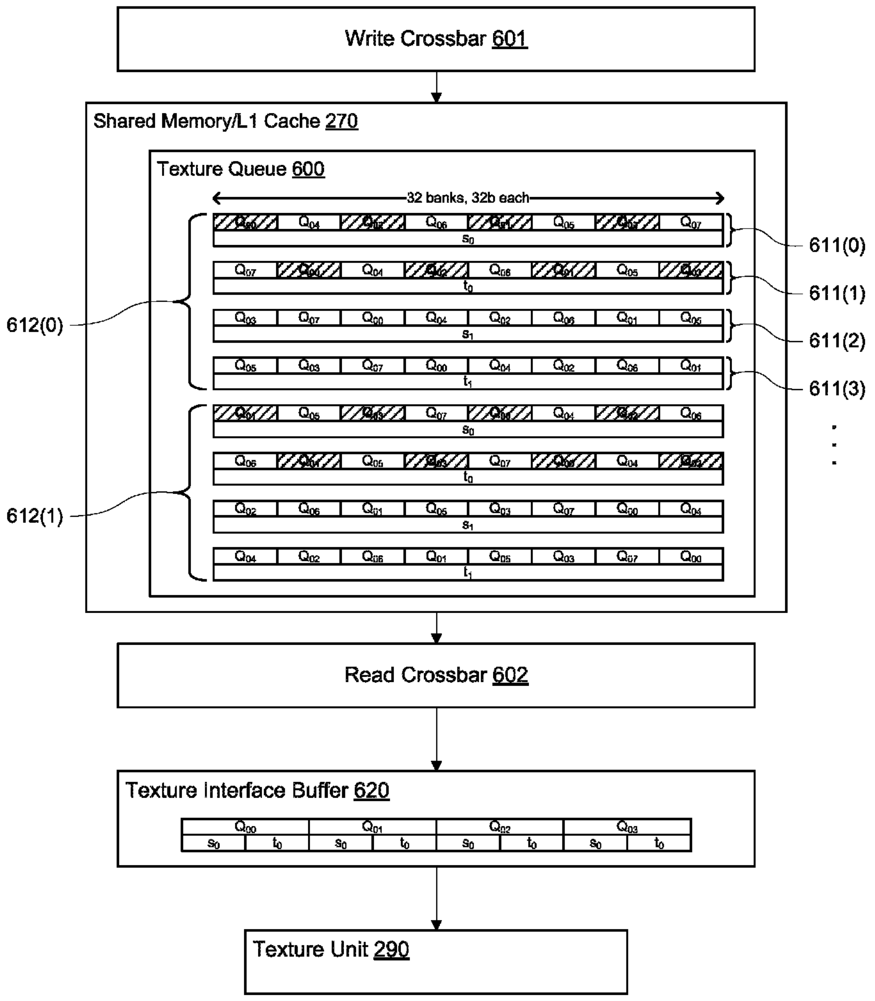
FIGS. 6D & 6E illustrate storing multiple batches of texture operations in the texture queue, in accordance with one embodiment.
Figure 6E:
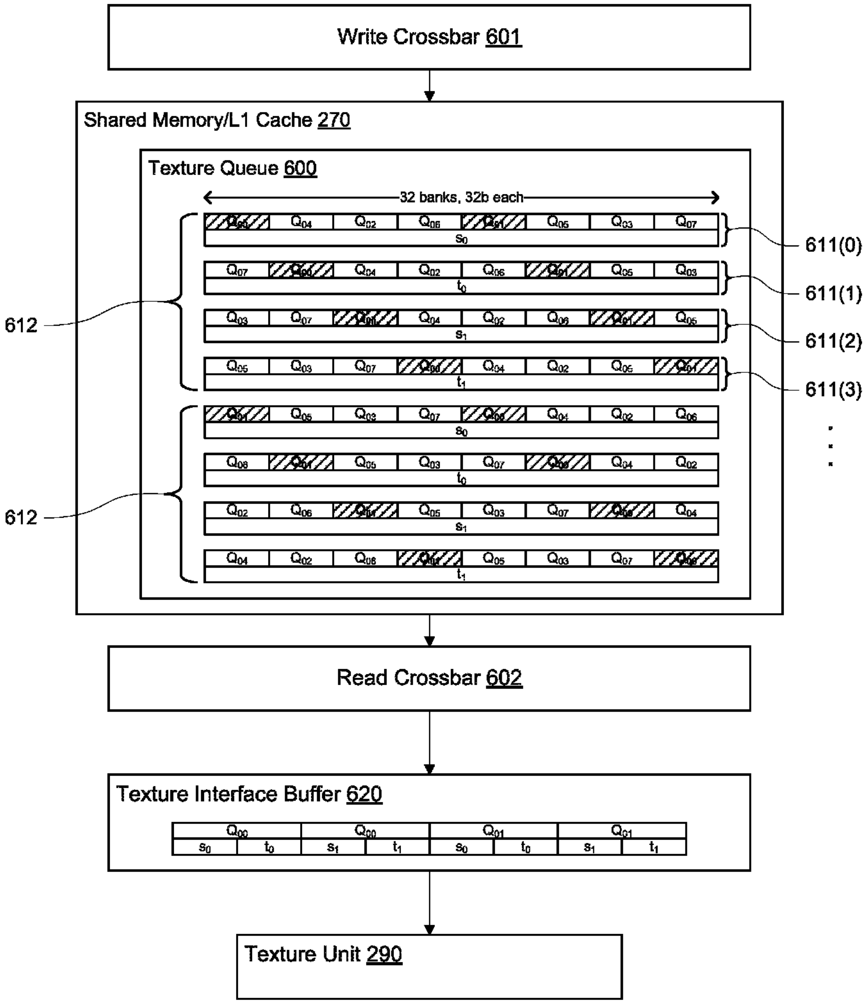

FIGS. 6D & 6E illustrate storing multiple batches of texture operations in the texture queue 600, in accordance with one embodiment. The texture coordinates shown in FIGS. 6D and 6E are associated with texture operations having two texture coordinates as operands, in contrast to the texture operations illustrated in FIGS. 6B and 6C, which have four texture coordinates as operands. In one embodiment, multiple batches of texture operations may be stored in the texture queue 600 at the same time. Each batch of texture operations may be associated with a different pixel tile. As shown in FIG. 6D, a first batch of texture operations is stored in a first space 612(0) reserved by the scheduler unit 210. In addition, a second batch of texture operations may be stored in a second space 612(1) reserved by the scheduler unit 210. A first s-coordinate ($s_0$) is stored in a first slot 611(0) of the first space 612(0), a first t-coordinate ($t_0$) is stored in a second slot 611(1) of the first space 612(0), a second s-coordinate ($s_1$) is stored in a third slot 611(2) of the first space 612(0), and a second t-coordinate ($t_1$) is stored in a fourth slot 611(3) of the first space 612(0). Similarly, a first s-coordinate ($s_0$) is stored in a first slot 611(0) of the second space 612(1), a first t-coordinate ($t_0$) is stored in a second slot 611(1) of the second space 612(1), a second s-coordinate ($s_1$) is stored in a third slot 611(2) of the second space 612(1), and a second t-coordinate ($t_1$) is stored in a fourth slot 611(3) of the second space 612(1).

Texture coordinates for the multiple batches of texture operations may be drained, in order, from the texture queue 600 according to the TexTile priority mode. First, texture coordinates for the first batch of texture operations may be drained from the texture queue 600. The texture coordinates for a first texture operation (i.e., $s_0$, $t_0$) for a plurality of quads (e.g., $Q_{00}$, $Q_{01}$, $Q_{02}$, and $Q_{03}$) are loaded into the texture interface buffer 620 and transmitted to the texture units 290 to generate texture values. Then, the texture coordinates for the first texture operation for other quads of the pixel tile (e.g., $Q_{04}$, $Q_{05}$, $Q_{06}$, and $Q_{07, etc.}$) are loaded into the texture interface buffer 620 and transmitted to the texture units 290 to generate texture values. Once all of the texture coordinates for the first texture operation have been transmitted to the texture units 290, the texture coordinates for the second texture operation for each of the quads of the pixel tile are loaded into the texture interface buffer 620 and transmitted to the texture units 290. Once texture coordinates from the first batch of texture operations have been processed by the texture units 290, texture coordinates from the second batch of texture operation may be drained from the texture queue 600. Note that, in one embodiment, the first batch and the second batch may be associated with different pixel tiles (i.e., the first batch may be associated with a first pixel tile and the second batch may be associated with a second pixel tile). In one embodiment, texture coordinates from the first batch and the second batch of texture operations may be drained from the texture queue 600 out of order (i.e., the second batch may be drained before the first batch) or in parallel (i.e., a portion of the texture coordinates from the first batch is drained and then a portion of the texture coordinates from the second batch is drained, or texture coordinates from both the first batch and the second batch are drained simultaneously and transmitted to different texture units).

In another embodiment, as shown in FIG. 6E, texture coordinates may be drained from the texture queue 600 according to the QuadTex priority mode. In the QuadTex priority mode, the texture coordinates for the texture operations in the first batch of texture operations for a first quad ($Q_{00}$) are loaded into the texture interface buffer 620 and transmitted to the texture units 290. Then, the texture coordinates for the texture operations in the first batch of texture operations for a second quad ($Q_{01}$) are loaded into the texture interface buffer 620 and transmitted to the texture units 290, and so forth until all of the texture coordinates associated with the first batch of texture operations have been transmitted to the texture units 290. Again, it will be appreciated that as many quads as will fit in the texture interface buffer 620 may be loaded into the texture interface buffer 620 in parallel and then drained to the texture units 290 in order. Then, texture coordinates associated with a second batch of texture operations are loaded into the texture interface buffer 620 and transmitted to the texture units 290, in order. Again, the embodiments illustrated by FIGS. 6D & 6E assume that the texture operations are associated with two texture coordinates.

Figure 6F:
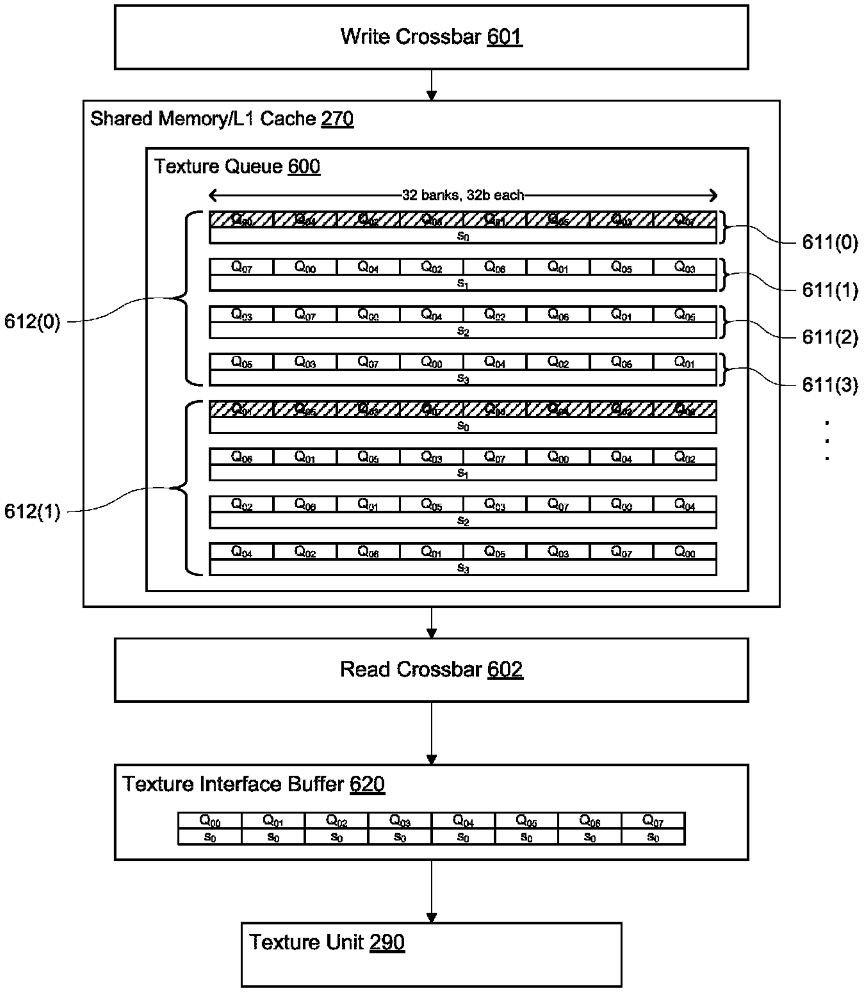
FIGS. 6F & 6G illustrate operation of the texture queue with batches of texture operations having a different number of texture operations, in accordance with another embodiment.
Figure 6G:
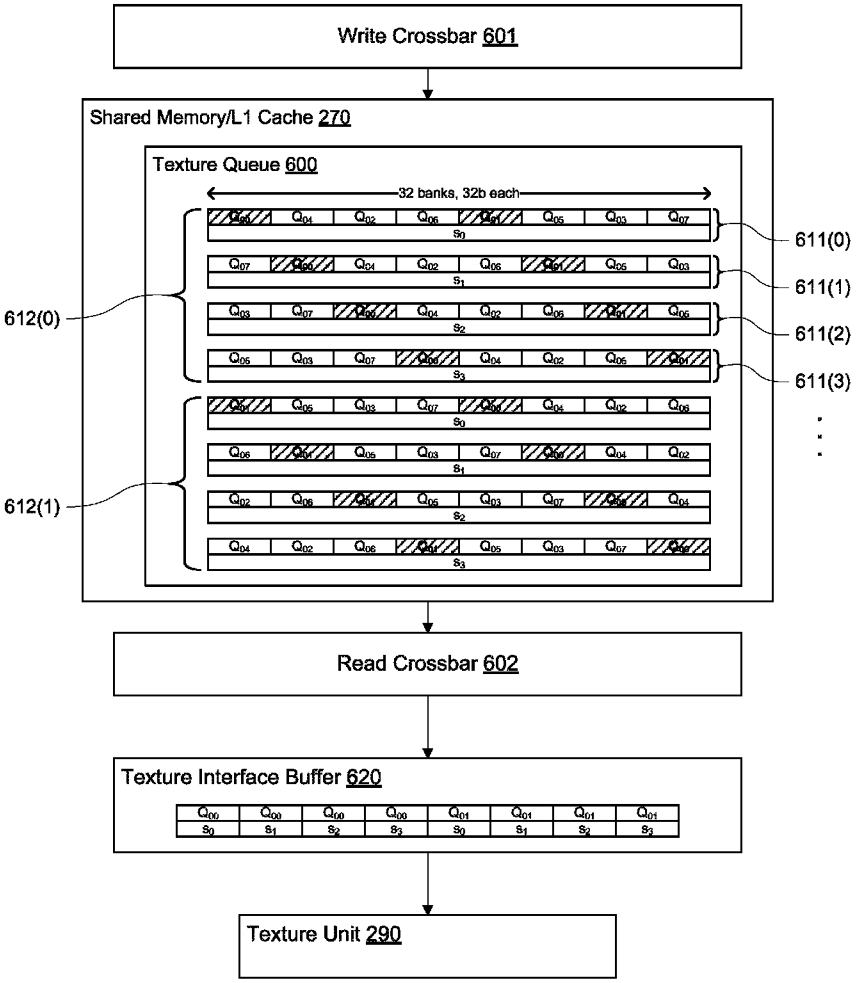

FIGS. 6F & 6G illustrate operation of the texture queue 600 with batches of texture operations having a different number of texture operations, in accordance with another embodiment. The number of texture operations in a batch of texture operations may vary. As shown in FIG. 6F, the number of texture operations in a batch may be four texture operations having a single texture coordinate as an operand (i.e., TEX $s_0$; TEX $s_1$; TEX $s_2$; and TEX $s_3$). It will be appreciated that the number of operands per texture operation and the number of texture operations per batch may vary.

In one embodiment, as shown in FIG. 6F, texture coordinates may be drained from the texture queue 600 according to the TexTile priority mode. The texture coordinates for a first texture operation (i.e., TEX $s_0$) for a plurality of quads (e.g., $Q_{00}$, $Q_{01}$, $Q_{02}$, $Q_{03}$, $Q_{04}$, $Q_{05}$, $Q_{06}$, and $Q_{07}$) are loaded into the texture interface buffer 620 and transmitted to the texture units 290 to generate texture values. Then, the texture coordinates for a second texture operation (i.e., TEX $s_1$) for the plurality of quads are loaded into the texture interface buffer 620 and transmitted to the texture units 290, and so forth for each of the texture operations in the batch of texture operations.

In another embodiment, as shown in FIG. 6G, texture coordinates may be drained from the texture queue 600 according to the QuadTex priority mode. The texture coordinates for the first batch of texture operations for a first quad ($Q_{00}$) are loaded into the texture interface buffer 620 and transmitted to the texture units 290. Texture coordinates for the first batch of texture operations for a second quad ($Q_{01}$) are loaded into the texture interface buffer 620 and transmitted to the texture units 290, and so forth until all of the texture coordinates associated with the first batch of texture operations have been drained from the texture queue 600. Again, it will be appreciated that as many quads as will fit in the texture interface buffer 620 may be loaded into the texture interface buffer 620 in parallel and then drained to the texture units 290 in order.

It will be appreciated, that in each of the embodiments illustrated in FIGS. 6B through 6G, TexTile priority mode corresponds to loading the texture coordinates for each of the quads in a pixel tile, in order, for one texture operation at a time in the batch of texture operations. In contrast, QuadTex priority mode corresponds to loading the texture coordinates for each of the texture operations in the batch of texture operations, in order, for one quad at a time in a pixel tile.

As shown in FIGS. 6B through 6G, each of the batches of texture operations includes texture operations of uniform size. In other words, a batch of texture operations may contain texture operations of one, two, three, four, or more coordinates as operands, and each of the texture operations in the batch of texture operations contains the same number of texture coordinates as operands. In some implementations, a batch of texture operations may contain texture operations of non-uniform size. For example, a first texture operation in the batch of texture operations may include two texture coordinates as operands while a second texture operation in the batch of texture operations may include three texture coordinates as operands.

In one embodiment, padding bits may be added to data stored in the texture queue 600 to cause each of the texture operations to have the same amount of data that is transmitted to the texture units 290. In such embodiments, the padding bits may not affect the output of the texture units 290. It will be appreciated, in some embodiments, that padding bits may not be stored in the texture queue 600 and that some bits (or banks) in a slot of the texture queue 600 may simply remain unused based on the alignment of texture operations that include a particular number of texture coordinates as operands. These unused bits do not need to be transferred to the texture units 290. In another embodiment, texture operations of multiple sizes may be transmitted to the texture units 290. However, care should be taken when scheduling texture operations of different sizes due to possible bank conflicts when loading texture coordinates in the texture queue 600 or storing texture values in the texture queue 600. In yet another embodiment, the batch of texture operations could be split into multiple batches of texture operations, where each batch of texture operations includes texture operations having a uniform size. Then, each of the batches of texture operations of uniform size may be processed independently.

Figure 7A:
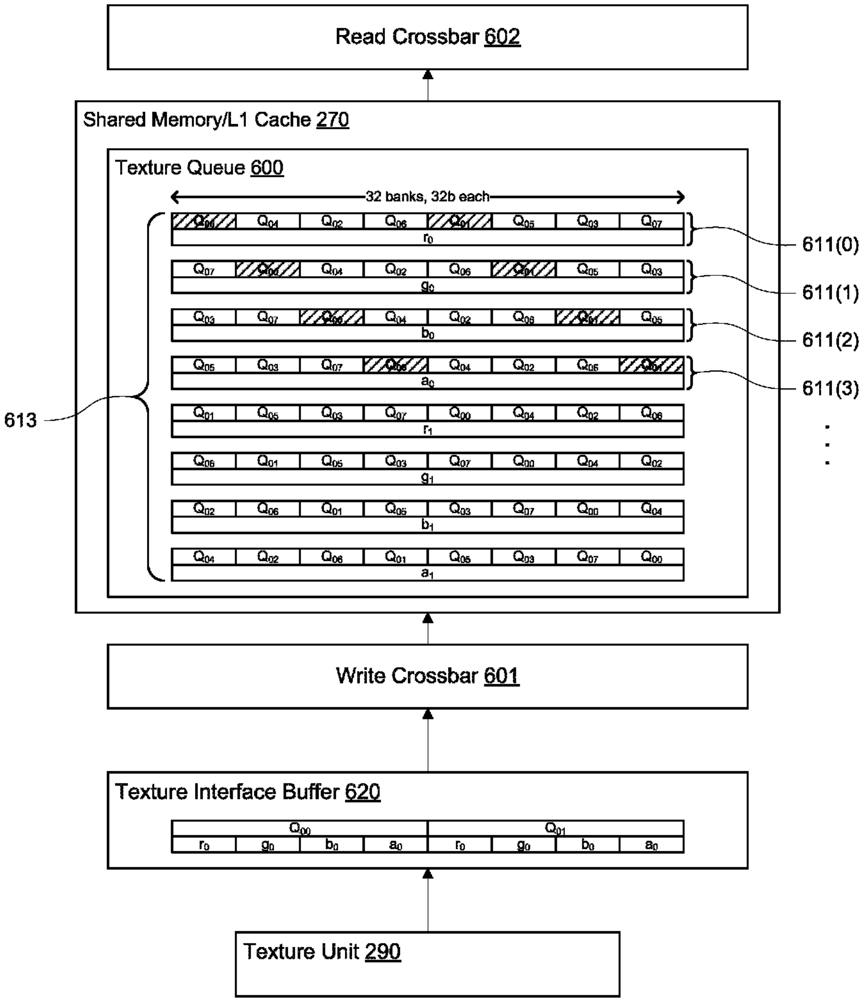
FIGS. 7A & 7B illustrate storing texture values in the texture queue, according to one embodiment.
Figure 7B:
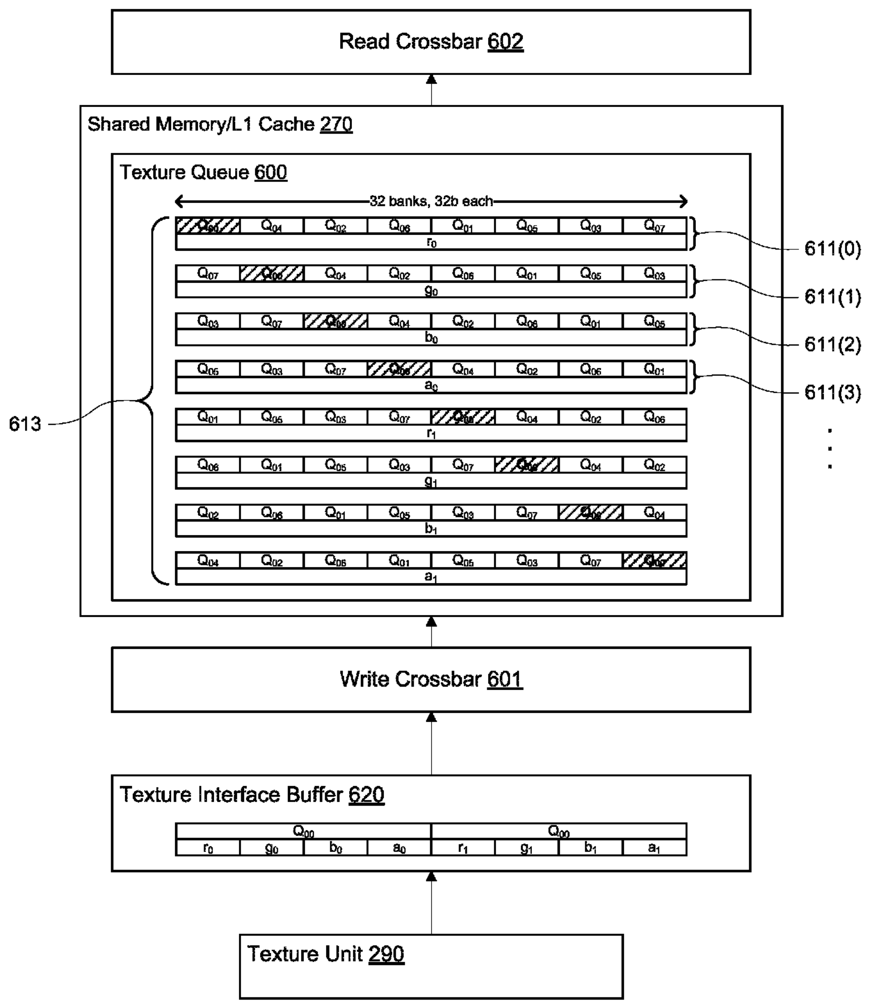

FIGS. 7A & 7B illustrate storing texture values in the texture queue 600, according to one embodiment. As the texture units 290 generate texture values for consumption by threads, the texture values are written to the texture queue 600 in a separate space 613 reserved by the scheduler unit 210. Again, in some embodiments, texture values may be stored in a separate and distinct texture queue from the texture queue that is configured to store texture coordinates. It will be appreciated that the operation and structure of a separate texture queue for storing texture values is similar to the operation of the texture queue 600 using the separate space 613. The texture values for each fragment may be given as one or more components such as one-component values (e.g., A), three-component values (e.g., RGB), four-component values (e.g., RGBA), as well as various other component combinations (e.g., CMYK). Texture values are stored in the texture queue 600 in the order the corresponding texture coordinates were received by the texture units 290. In one embodiment, as shown in FIG. 7A, the arrangement of texture values returned from the texture units 290 may be similar to the arrangement of texture coordinates in the texture queue 600 prior to texture coordinates being drained from the texture queue 600.

In one embodiment, as shown in FIG. 7A, texture coordinates may be drained from the texture queue 600 according to the TexTile priority mode. In the TexTile priority mode, the texture units 290 generate texture values associated with the first texture operation (i.e., $r_0$, $g_0$, $b_0$, $a_0$) for each of the quads in a pixel tile, in order, before generating texture values associated with the second texture operation for each of the quads in the pixel tile, and so forth. In other words, the texture units 290 generate texture values for a first texture operation before texture values are generated for subsequent texture operations in the batch of texture operations. Although the texture values generated by the texture units 290 are transmitted to the texture queue 600 in order, the texture interface buffer 620, in conjunction with the write crossbar 601, may rearrange the order of the texture values stored in the texture queue 600. In one embodiment, the texture interface buffer 620 of FIGS. 7A-7B configured to store texture values is the same unit as the texture interface buffer 620 of FIGS. 6A-6G configured to store texture coordinates. In another embodiment, separate and distinct texture interface buffers 620 are provided, a first texture interface buffer 620 configured to store texture coordinates drained to the texture units 290 and a second texture interface buffer 620 configured to store texture values generated by the texture units 290.

In another embodiment, as shown in FIG. 7B, texture coordinates may be drained from the texture queue 600 according to the QuadTex priority mode. In the QuadTex priority mode, the texture units 290 generate texture values associated with the first quad ($Q_{00}$) for each of the texture operations in the batch of texture operations. Then, the texture units 290 generate texture values associated with the second quad ($Q_{01}$) for each of the texture operations in the batch of texture operations, and so forth for each of the quads in the pixel tile. The texture interface buffer 620, in conjunction with the write crossbar 601, stores the texture values in the correct location within the texture queue 600.

In one embodiment, the functionality of the TRB 400 and the texture queue 600 may be combined in one portion of memory in the shared memory/L1 cache 270. For example, the TIM table 520 may associate locations in the texture queue 600 with texture identifiers such that slots in the texture queue 600 function as slots of the TRB 400. Merging the functionality of the TRB 400 and the texture queue 600 has some benefits, such as reducing the need for double buffering, while implementing the TRB 400 in the register file 220 and the texture queue 600 in the shared memory/L1 cache 270 has other benefits, such as making it easier for threads to consume final texture values directly from the TRB 400. In another embodiment, a portion of the shared memory/L1 cache 270 may be allocated as the TIM table 520, and another portion of the shared memory/L1 cache 270 may be allocated as the TRB free list table.

Figure 8:
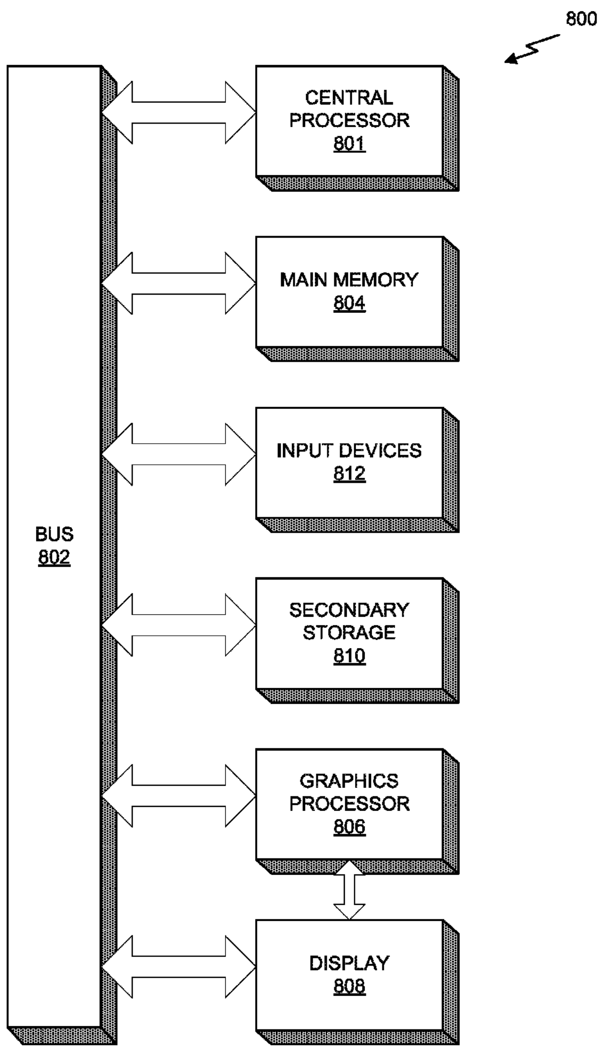
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A processor comprising:

a texture queue implemented in a memory of the processor;

a crossbar coupled to the texture queue; and a texture unit coupled to the texture queue via the crossbar, wherein the crossbar is configured to reorder texture coordinates for consumption by the texture unit and to reorder texture values received from the texture unit, wherein the texture queue is configured to store one or more texture coordinates, and wherein the texture unit drains the one or more texture coordinates from the texture queue.

2. The processor of claim 1, wherein the processor further comprises a scheduler unit.

3. The processor of claim 2, wherein the scheduler unit is configured to dynamically allocate memory spaces in the texture queue, each memory space associated with a particular batch of texture operations for one or more quads of a particular pixel tile.

4. The processor of claim 1, the processor further comprising a plurality of texture units, wherein the plurality of texture units are configured to drain a number of texture coordinates from the texture queue in parallel.

5. The processor of claim 4, wherein the texture queue comprises a first portion of memory for storing texture coordinates for transmission to the plurality of texture units and a second portion of memory for storing texture values received from the plurality of texture units.

6. The processor of claim 5, wherein the texture coordinates are drained from the texture queue according to a TexTile priority mode.

7. The processor of claim 5, wherein the texture coordinates are drained from the texture queue according to a QuadTex priority mode.

8. The processor of claim 5, wherein the texture queue is coupled to a first texture interface buffer configured to reorder texture coordinates for consumption by the plurality of texture units.

9. The processor of claim 8, wherein the texture queue is coupled to a second texture interface buffer configured to reorder texture values received from the plurality of texture units for transmission to the texture queue.

10. The processor of claim 1, wherein the texture unit is configured to generate texture values that represent filtered values generated by sampling a texture map.

11. The processor of claim 1, wherein the texture unit comprises:

a texture filtering unit configured to filter sampled texture data to generate a texture value that is transmitted to the texture queue;

a texture address unit configured to generate one or more physical addresses based on one or more texture coordinates associated with a texture operation; and a texture latency FIFO (First-in, First-out) coupled to the texture address unit and configured to buffer texture operations while sampled texture data is fetched from memory locations corresponding to the one or more physical addresses.

12. The processor of claim 1, wherein the processor is a graphics processing unit.

13. A system comprising:

a processor comprising:

a texture queue implemented in a memory of the processor, a crossbar coupled to the texture queue; and a texture unit coupled to the texture queue via the crossbar, wherein the crossbar is configured to reorder texture coordinates for consumption by the texture unit and to reorder texture values received from the texture unit, and wherein the texture queue is configured to store one or more texture coordinates, and wherein the texture unit drains the one or more texture coordinates from the texture queue.

14. The system of claim 13, wherein the processor further comprises a scheduler unit configured to dynamically allocate memory spaces in the texture queue, each memory space associated with a particular batch of texture operations for one or more quads of a particular pixel tile.

15. The system of claim 13, wherein the texture queue comprises a first portion of memory for storing texture coordinates for transmission to the one or more texture units and a second portion of memory for storing texture values received from the one or more texture units.

16. The system of claim 13, wherein the texture unit comprises:

a texture filtering unit configured to filter sampled texture data to generate a texture value that is transmitted to the texture queue;

a texture address unit configured to generate one or more physical addresses based on one or more texture coordinates associated with a texture operation; and a texture latency FIFO (First-in, First-out) coupled to the texture address unit and configured to buffer texture operations while sampled texture data is fetched from memory locations corresponding to the one or more physical addresses.

17. The system of claim 13, wherein the texture queue is coupled to a first texture interface buffer configured to reorder texture coordinates for consumption by the texture unit.

18. The system of claim 13, wherein the processor comprises a graphics processing unit.

19. The system of claim 13, wherein the processor is included in a system-on-chip (SoC).

* * * * *